July 30, 1935.  C. L. WETTERHOLM  2,009,827
CAMERA SHUTTER AND FLASH LIGHT SYNCHRONIZING DEVICE
Filed May 3, 1933  2 Sheets-Sheet 1
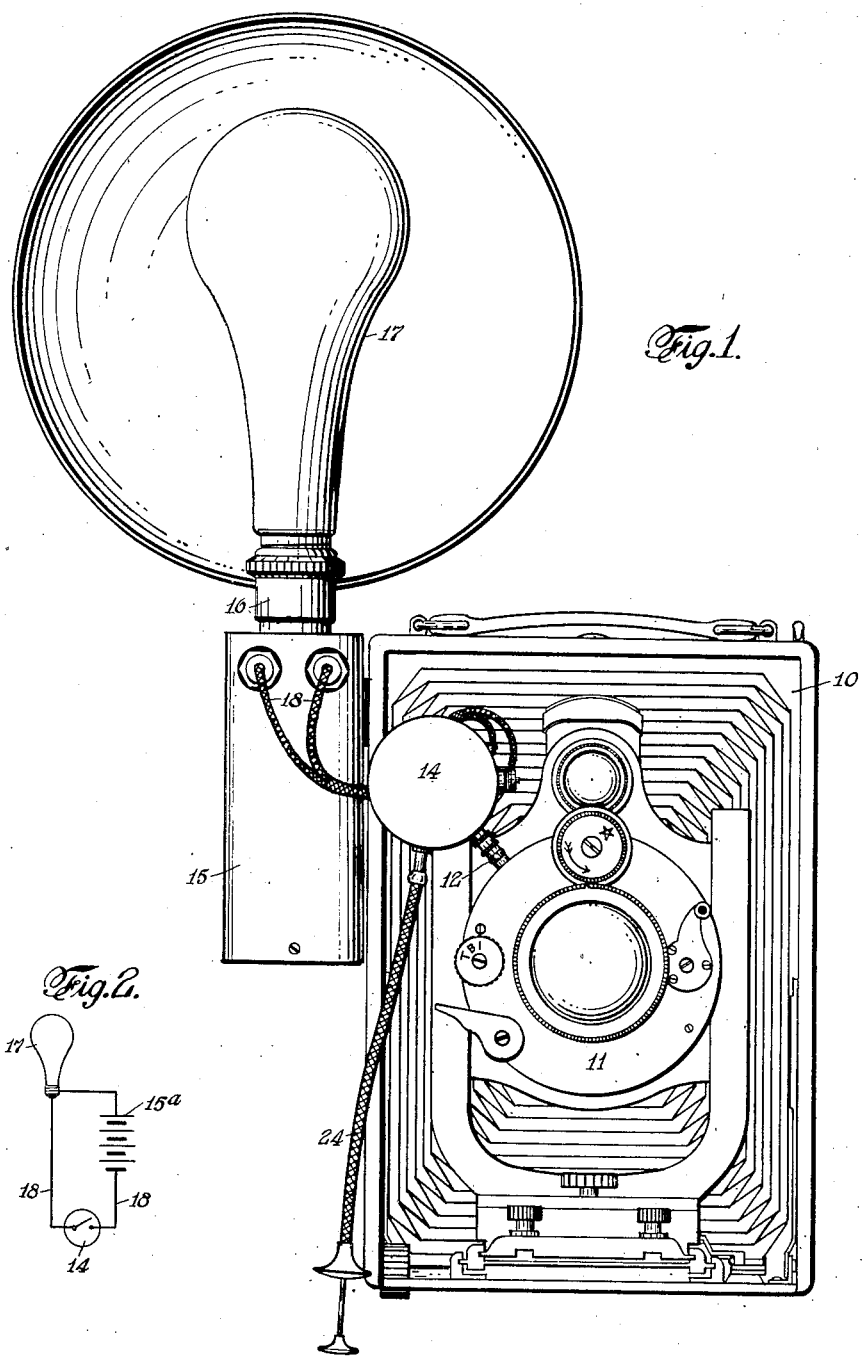
INVENTOR
Charles L. Wetterholm
BY
Williams, Rich & Morse
ATTORNEYS July 30, 1935.   C. L. WETTERHOLM   2,009,827
CAMERA SHUTTER AND FLASH LIGHT SYNCHRONIZING DEVICE
Filed May 3, 1933   2 Sheets—Sheet 2
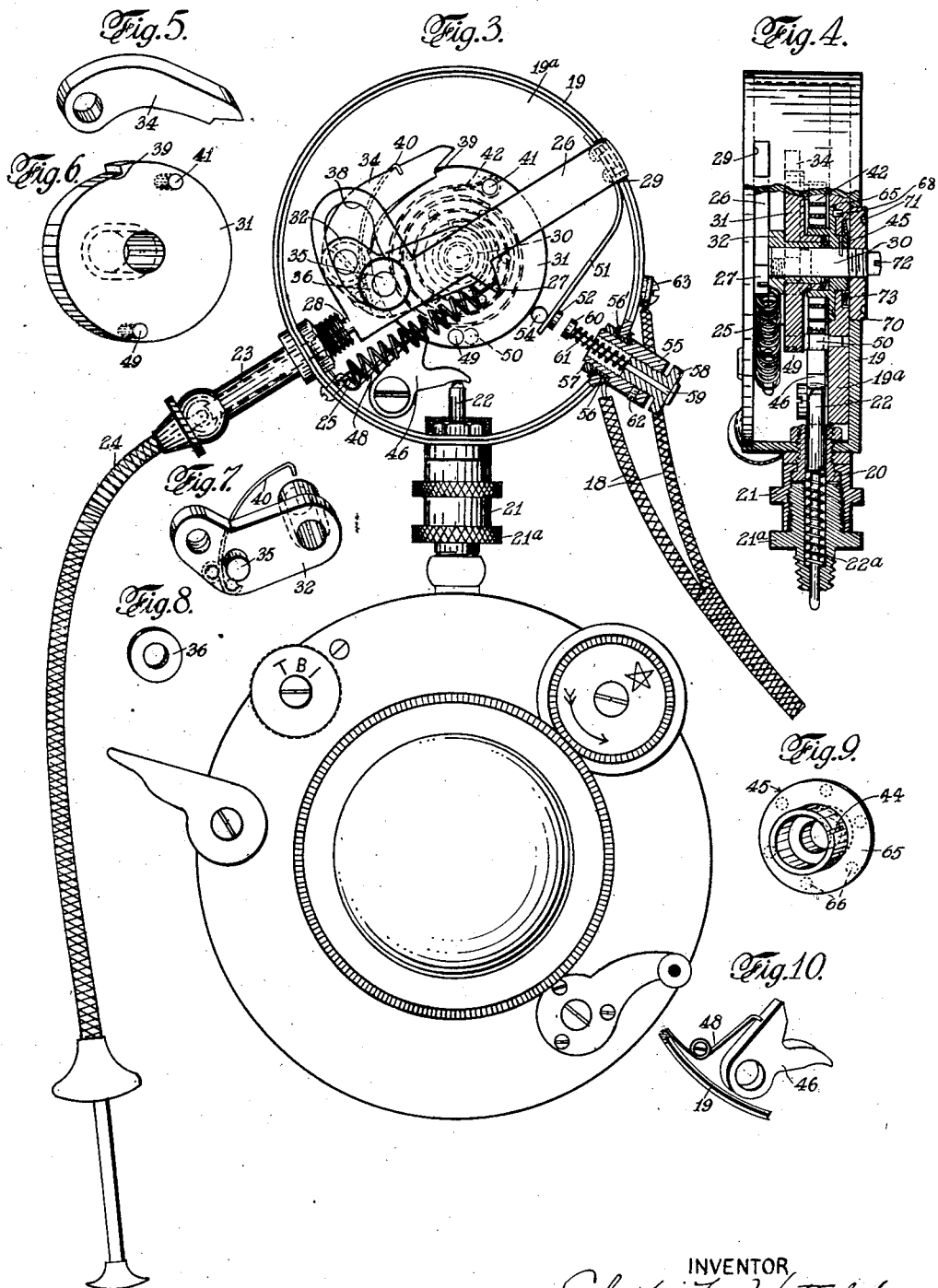
INVENTOR
Charles L. Wetterholm
BY
Williams, Rich + Evans
ATTORNEYS Patented July 30, 1935

2,009,827

UNITED STATES PATENT OFFICE 2,009,827

CAMERA SHUTTER AND FLASH LIGHT SYNCHRONIZING DEVICE

Charles Leonard Wetterholm, Brooklyn, N. Y.

Application May 3, 1933, Serial No. 669,164

9 Claims. (Cl. 67—29)

The invention pertains to mechanism for causing the operation of a camera shutter in synchronization with the momentary production of light by a source of artificial illumination suitable for photographic purposes.

An object of the invention is to provide a device which will operate a camera shutter simultaneously with the period of maximum illumination by a flashlight which is electrically ignited. Further objects are the provision of a device wherein electrical contacts are closed in predetermined time relation to the actuation of a camera shutter; the provision of a device which is normally in operative position and requires no manipulation to make it ready to perform its functions; the provision of a device in which the electrical circuit is normally open and is closed only by the operation of the device when actuated by the operator; and the provision of a device which may be readily adjusted for use with different camera shutters. Further objects will appear from the following description.

In the photography of moving objects, the required exposure for satisfactory results is shorter in duration than the period of effective illumination from such sources as burning flashlight powder or flashlight bulbs of the metal foil and oxygen type. Furthermore, the intensity of illumination from such sources builds up to a maximum gradually from the instant of ignition and then gradually decreases from maximum to zero. To effectively use such light sources with high shutter speeds it is therefore essential that the opening and closing of the shutter be so timed as to fall within or to include the period of maximum light radiation from the light source.

Inherent in all flashlight illumination from sources which are ignited by electricity is a time lag between the closing of the circuit and the beginning of the period of maximum illumination. This lag comprises two components. The first component is the time required for the current to heat up and set off the getter which ignites the light-producing material and the second is the time interval between ignition of the illuminant and the beginning of maximum illumination. Additionally, the time required for the operation of camera shutters after their mechanism is set into operation must be taken into consideration. In a device of this character, therefore, provision must be made for closing the electrical contact for igniting the flashlight in proper time relation to the operation of the shutter mechanism so that the maximum opening of the shutter is synchronous with or includes the period of maximum illumination from the light source. In the majority of cases the time lag of the light source exceeds the lag of the shutter mechanism. The electrical circuit which operates the light source must therefore be closed prior to tripping the shutter. The embodiment of the invention hereinafter described is adapted for operation in this manner but may readily be modified (as hereinafter explained) to reverse the sequence of events so that the shutter is tripped prior to closing the circuit or so that these events will occur simultaneously. These alternative methods of operation are within the scope of the invention.

The present invention provides means whereby the foregoing requirements are met and consists, broadly, of synchronizing mechanism which is attached to a camera shutter in such manner as to trip it when operated and which is also connected in an electrical circuit containing a flashlight and adapted to close a normally open circuit when the mechanism is operated, igniting the flashlight in a known manner. This mechanism, when once adjusted to provide the proper time relationship between the closing of the circuit and the tripping of the shutter, is normally in operative position and after being operated under the control of the photographer automatically returns to operative position, requiring no winding or setting, as do other devices of this kind. This feature is a great advantage as there is no manipulation which may be forgotten by the user, resulting in failure to secure a picture; and by reason of the fact that the mechanism automatically returns to open circuit condition there is no danger of accidentally igniting a replacement photoflash bulb by the operator forgetting to open the circuit before inserting it in its socket. Moreover, the time interval between closing the circuit and operating the shutter is uniform, for any given adjustment of the mechanism, eliminating the human factor and the necessity for any exercise of skill.

The preferred mode of applying the invention is explained in the drawings, taken in conjunction with the following detailed description, wherein Fig. 1 is an elevation showing a camera having a shutter to which a synchronizer has been attached, and a photoflash bulb and reflector mounted on a battery box which is secured to the camera and electrically connected to the synchronizer; Fig. 2 is a diagram of the electrical connections between flashlight, battery and synchronizer; Fig. 3 illustrates the synchronizer attached to a camera shutter and shows, in plan view, the operating mechanism; Fig. 4 is a broken side view of the synchronizer, partly in cross-section; Fig. 5 is a separate view of the pawl; Fig. 6 is a separate view of the actuating member; Fig. 7 is a separate view of the arm which carries the pawl; Fig. 8 shows the roller which is attached to the arm; Fig. 9 shows the spring-adjusting collar and Fig. 10 shows the shutter operating lever and the spring associated with it.

Referring to the drawings, Fig. 1 shows a camera 10 equipped with a shutter 11 having the usual threaded connection 12 for a cable release to which is secured the synchronizer 14. Attached to the camera in a suitable position is a battery box 15 upon which is mounted a socket 16 for receiving a flashlight 17. The batteries 15a (Fig. 2) in the box 15 and the flashlight 17 are connected in series with the wires 18 which are attached to contacts on the synchronizer 14, which acts as a switch, as shown diagrammatically in Fig. 2.

Referring to Figs. 3 and 4 the synchronizer is provided with an outer casing 19, which may be provided with a suitable cover, in which the operating mechanism is mounted. For connecting the device to the camera shutter a tube 20 is secured in the wall of the case 19. A collar on tube 20 carries an independently rotatable member 21, having a flange which interlocks with the collar on tube 20, into which is screwed a plug 21a threaded at its outer end for fastening to the cable release connection on the shutter. In a central chamber formed in the tube 20 and plug 21a is a plunger 22 which communicates movement from the operating mechanism of the synchronizer to the mechanism of the camera shutter. This plunger is normally pushed inwardly by the spring 22a which surrounds it. For operating the device, the case 19 also carries a tube 23 adapted to receive the usual cable release 24.

Within the case 19 is a slide 26 having a stem portion 28 which lies within the tube 23, the slide and stem being mounted for reciprocating movement, the end of the slide opposite the stem having a bearing in an aperture 29 in the case 19. The slide 26 is normally held against the tube 23 by the spring 25 suitably secured at one end to any stationary part such as the case 19 and having its other end attached to a lug 27 on the slide 26.

For convenience in assembling the mechanism, a base plate 19a is provided which has the same diameter as the inside of case 19. Centrally located relative to base plate 19a is a hub 30 upon which are rotatably mounted an actuating member 31 and an arm 32, which extends beyond the periphery of the actuating member 31, and has pivotally attached to its end a pawl 34. Upon the arm 32 is a stud 35 upon which is mounted a roller 36 which bears against the walls of the opening 38 in slide 26. The arm 32 rests against the face of the actuating member 31 and the pawl 34 is fastened to the under side of the arm 32 so that the disc 31 and the pawl 34 are in the same plane. Part of the periphery of the actuating member 31 is cut away so as to provide it with a shoulder 39 against which the face of the pawl 34 rests under the influence of a spring 40 which is secured to the arm 32, as shown in Fig. 7.

To a pin 41 in the disc 31 one end of a spiral spring 42 is secured, the spring being concentric with the hub 30 and having its other end secured in a slot 44 in the collar 45 (Fig. 9). The collar 45 is concentric with hub 30 and occupies a circular, stepped opening in base plate 19a. Mounted adjacent the tube 20 on the base plate 19a is a shutter operating lever 46 (Fig. 10) generally in the form of a bell-crank with one leg resting against the plunger 22 and the other leg underneath the edge of the actuating member 31 and normally held in this position by the spring 48.

Secured in the actuating member 31 and projecting therefrom on the same side of the disc on which the lever 46 is found is a pin 49 placed so as to engage one leg of the lever 46 when the actuating member 31 is rotated. Secured to the base plate 19a is a stop 50 so placed that the pin 49 will strike it and limit the rotation of the actuating member 31 in a counterclockwise direction.

Secured to the wall of the case 19 is a flat contact carrying spring 51 carrying the contact 52. The end of the spring 51 normally rests against a pawl lifter 54 mounted on the base plate 19a adjacent the periphery of the actuating member 31. Also mounted on the wall of case 19 opposite the contact 52 is an insulated contact-carrying assembly provided with means for adjusting the position of the contact and comprising a threaded, hollow bushing 55, insulated from the case 19 by the insulating washers 56 and 56', and secured thereto by the nut 57, a contact carrying member 58, externally threaded to screw into the bushing 55, in which is a central opening through which a contact carrying pin 59 extends. On the end of pin 59 is a contact 60 which is held away from the end of the member 58 by the spring 61. One of the wires 18 is secured under the bushing 55 before it is fastened to the casing. The distance of the contact 60 from the contact 52 may be adjusted by screwing the member 58 in or out and it may then be locked in position by the set-screw 62 in the wall of bushing 55. The other of the wires 18 is secured by a screw 63 to the conductive casing 19 through which current is carried to spring 51 and contact 52.

In the embodiment illustrated, means are provided for adjusting the tension of the spiral spring 42 so as to permit varying the speed of rotation of the actuating member 31 and the force with which pin 49 on actuating member 31 will strike lever 46. The adjusting means is as follows: Referring to Figs. 4 and 9, the collar 45 to which the end of spring 42 is anchored is keyed to the hub 30. The flange 65 of collar 45 is provided with a plurality of shallow holes 66. Into the face of the circular opening in base plate 19a, a pin 68 is secured so as to enter any one of the depressions 66. The hub 30 is threaded at its outer end to receive a circular nut 70 provided with holes 71 into which a wrench may be inserted and the hub 30 is provided with a slot 72. A spring washer 73 lies in an opening in base plate 19a and tends to hold collar 45 against the face of the base plate as nut 70 is unscrewed. By unscrewing nut 70 sufficiently to permit collar 45 to be pushed away from base plate 19a and clear the pin 68, it is apparent that by inserting a screwdriver in the slot 72 in hub 30 and exerting an inward pressure the hub can be revolved, carrying with it collar 45 which in turn carries one end of spring 42 which is to be adjusted. When the desired tension is secured the nut 70 is tightened and the collar 45 is locked in place by pin 68.

The operation of this embodiment of the invention is as follows: The mechanism is normally at rest and ready for operation as illustrated in Fig.

3 and it is assumed that it has been properly adjusted with respect to the synchronization of the camera shutter and the source of illumination. The plunger of the cable release 24 is depressed and the end of the cable, pressing against the stem 28 of slide 26, moves the slide in the direction of its long axis. The wall of the opening 38 presses against the roller 36 and causes the arm 32 to revolve in a clockwise direction about the hub 30, carrying with it the pawl 34. The pawl 34, pressing against the shoulder 39 on the actuating member 31, under the influence of the spring 40, causes the disc to revolve against the tension of the spiral spring 42. The actuating member 31 continues to so rotate until the angular face of pawl 34 strikes the pawl lifter 54 and as the rotation continues the pawl lifts itself away from the disc by the camming action of its angular face on pawl lifter 54, whereupon the actuating member 31 is released and revolves, under the influence of spring 42, in a counterclockwise direction. Pin 49 on the actuating member 31 strikes the leg of lever 46 which moves lever 46 so as to depress the plunger 22 and trip the shutter. It is evident that if the device were to be used with a camera shutter which is electrically operated that the plunger 22 and associated parts might be replaced by electrical contacts which could be closed by the lever 46.

The foregoing relates to the operation of the camera shutter. The operation of the flashlight is as follows: When the tip of pawl 34 strikes pawl lifter 54 the pawl begins to rise, as explained, and in rising pushes spring 51 and contact 52 toward contact 60. Preferably the contacts are adjusted so that they do not touch until shoulder 39 of the actuating member 31 slips from the pawl. When this occurs the actuating member 31, acting as a cam on the under side of pawl 34, lifts it further, closing the contacts and permitting current to flow through the circuit to ignite the flash.

It is evident that when the device is adjusted to operate as just described the counterclockwise rotation of the actuating member 31 first closes the contacts and subsequently strikes lever 46 to trip the shutter. The time interval between these events is determined by the tension of the spring 42, the distance between the electrical contacts 52 and 60, the shape of the actuating member 31 and of the pawl 34, and the location on the actuating member of the pin 49 which strikes the shutter operating lever. By suitably arranging these factors the time interval and the sequence of events may be arranged to suit any given case, as will be evident to any skilled mechanic.

Various modifications may be made in the construction shown in the drawings and above particularly described, within the purview of my invention.

I claim:

1. A shutter and flashlight synchronizing device comprising, in combination, means for closing an electrical circuit for a flashlight, means for tripping the shutter, an actuating member mounted for movement against the tension of a spring and adapted to actuate the two means aforesaid, means under the control of the operator for moving the actuating member to put the spring under tension, and means for automatically causing the release of the actuating member at a fixed point during its travel, whereby it returns to normal position under the influence of the spring.

2. A shutter and flashlight synchronizing device comprising, in combination, circuit-closing electrical contacts, means for closing said contacts, means for adjusting said contacts, means for tripping the shutter, an actuating member mounted for movement against the tension of a spring and arranged to actuate said contact closing means and said shutter tripping means, means under the control of the operator for moving the actuating member to put the spring under tension, and means for automatically causing the release of the actuating member at a fixed point during its travel, whereby it returns to normal position under the influence of the spring.

3. A shutter and flashlight synchronizing device comprising, in combination, circuit closing electrical contacts, means for operating said contacts, means for tripping the shutter, an actuating member mounted for movement against the tension of a spring and arranged to actuate said contact operating means and said shutter tripping means, means under control of the operator for moving the actuating member to put the spring under tension, means for adjusting the initial tension of said spring, and means for automatically causing the release of the actuating member at a fixed point during its travel, whereby it returns to normal position under the influence of the spring.

4. In a synchronizing device for operating a flashlight and a camera shutter, the combination of a pair of normally open electrical contacts, means for tripping the shutter, an actuating member adapted to be moved against the pressure of a spring and to be released at a predetermined point in its travel to return to normal position, means carried by said member for engaging the shutter operating means when said member is returning to normal position, means for closing said contacts during the return of said member to normal position, and means under the control of the operator for moving said member.

5. A shutter and flashlight synchronizer comprising a rotatably mounted actuating member, a pawl for rotating said member, a spring adapted to be put under tension by the rotation of said member, means under the control of the operator for moving said pawl, means for disengaging said pawl from said member when said pawl passes a predetermined point, normally open electrical contacts adapted to be closed by engagement with said pawl, and shutter operating means adapted to be engaged by said actuating member when returning to normal position.

6. A device for igniting a flashlight and actuating a shutter in predetermined time relation, comprising a reciprocating slide adapted to cooperate with a bearing, a hub, an arm mounted for rotation about said hub and carrying a bearing which cooperates with said slide, a pawl pivotally attached to said arm, an actuating member rotatably mounted on said hub, a spring associated with said member for returning it to normal position, means for holding said pawl in engagement with said member, means for disengaging said pawl from said member at a fixed point in its rotation, a pair of electrical contacts adapted to be closed, contact-closing means and shutter tripping means, the two last mentioned means adapted to be sequentially operated by said actuating member upon its return to normal position.

7. In a flashlight and shutter synchronizer having a pair of electrical contacts, a spring operated actuating member, and a pawl for rotating said member, contact closing means comprising, in combination, a stationary pawl lifter adjacent the periphery of said member adapted to engage a face of said pawl, a resilient support for one of said contacts having its free end adjacent said pawl lifter, and a section of the periphery of said member so formed as to move said pawl upon rotation of said member to close said contacts.

8. In a flashlight and shutter synchronizer having a spring operated actuating member, means for rotating said member to tension said spring and means for releasing said member for return to normal position under the influence of said spring, shutter tripping means comprising, in combination, a coupling for attaching said synchronizer to a shutter, a plunger within said coupling and protruding therefrom, a lever associated with said plunger, and means on said actuating member for moving said lever to move said plunger when said member is returning to normal position.

9. In a flashlight and shutter synchronizer having a spring operated actuating member and a hub about which said member rotates, tension adjusting means for said spring comprising a collar mounted upon said hub and secured against rotation thereon and adapted to receive one end of said spring, a base plate against which said collar is secured, and means for securing said collar against rotation relative to said base plate.

CHARLES LEONARD WETTERHOLM.